US011366128B2

(12) United States Patent
Beauducel et al.

(10) Patent No.: US 11,366,128 B2
(45) Date of Patent: Jun. 21, 2022

(54) BIOLOGICAL ANALYSIS SYSTEM WITH TREATMENT OF SPECIFIC HOLDERS

(71) Applicant: HORIBA ABX SAS, Montpellier (FR)

(72) Inventors: Florent Beauducel, Montpellier (FR); Philippe Benezeth, Caissargues (FR); Thibault Cres, Vendargues (FR)

(73) Assignee: HORIBA ABX SAS, Montpellier (FR)

( * ) Notice: Subject to any disclaimer, the term of this patent is extended or adjusted under 35 U.S.C. 154(b) by 243 days.

(21) Appl. No.: 16/479,088

(22) PCT Filed: Jan. 17, 2018

(86) PCT No.: PCT/FR2018/050112
§ 371 (c)(1),
(2) Date: Jul. 18, 2019

(87) PCT Pub. No.: WO2018/134519
PCT Pub. Date: Jul. 26, 2018

(65) Prior Publication Data
US 2020/0011888 A1 Jan. 9, 2020

(30) Foreign Application Priority Data
Jan. 19, 2017 (FR) ...................................... 1750431

(51) Int. Cl.
*G01N 35/00* (2006.01)
*B01L 9/06* (2006.01)
*G01N 35/04* (2006.01)

(52) U.S. Cl.
CPC .......... *G01N 35/00732* (2013.01); *B01L 9/06* (2013.01); *G01N 35/0095* (2013.01);
(Continued)

(58) Field of Classification Search
CPC ......... G01N 35/00732; G01N 35/0095; G01N 35/04; G01N 2035/00752;
(Continued)

(56) References Cited

U.S. PATENT DOCUMENTS

2006/0245865 A1 11/2006 Babson
2013/0125675 A1* 5/2013 Muller ................... G01B 11/10
73/864.23
2018/0002108 A1* 1/2018 Tatsutani ................. B01L 9/06

FOREIGN PATENT DOCUMENTS

EP 1505396 A2 2/2005
EP 2455762 A1 5/2012
WO 2016148167 A1 9/2016

OTHER PUBLICATIONS

International Search Report received in PCT/FR2018/050112 dated Mar. 6, 2018 with English Translation.

* cited by examiner

*Primary Examiner* — Jill A Warden
*Assistant Examiner* — John McGuirk
(74) *Attorney, Agent, or Firm* — Arent Fox Schiff LLP

(57) ABSTRACT

A biological analysis system comprising at least one inlet and one outlet, at least two biological analysis devices connected to one another by a conveyor defining a closed circuit, each biological analysis device comprising a region for the exchange of tube holding racks with the conveyor. The conveyor and the at least one inlet of the biological analysis system comprise a reader of an identifier of a tube holding rack which reader is designed to communicate an identifier it has read to a controller of the biological analysis system, which controller is designed to apply a specific treatment to a tube holding rack identified by the reader of
(Continued)

Figure 1:
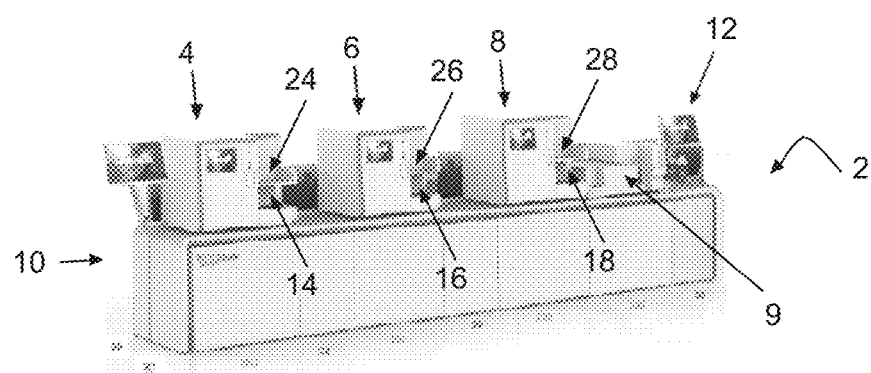

the conveyor and the identifier of which has not previously been read by the reader of the at least one inlet of the biological analysis system.

12 Claims, 1 Drawing Sheet

(52) U.S. Cl.
CPC .......... *G01N 35/04* (2013.01); *B01L 2200/04* (2013.01); *B01L 2200/143* (2013.01); *B01L 2200/18* (2013.01); *B01L 2300/021* (2013.01); *G01N 2035/00752* (2013.01); *G01N 2035/00801* (2013.01); *G01N 2035/0465* (2013.01)

(58) Field of Classification Search
CPC . G01N 2035/00801; G01N 2035/0465; G01N 2035/00326; G01N 2035/00772; G01N 35/00693; B01L 9/06; B01L 2200/04; B01L 2200/143; B01L 2200/18; B01L 2300/021
See application file for complete search history.

BIOLOGICAL ANALYSIS SYSTEM WITH TREATMENT OF SPECIFIC HOLDERS

CROSS-REFERENCE TO RELATED APPLICATIONS

This application is a National Stage Entry of PCT/FR2018/050112, filed Jan. 17, 2018, which claims priority to French Patent Application No. 1750431 filed on Jan. 19, 2017, the disclosures of each of which are hereby incorporated by reference in their entireties.

The invention relates to the field of biological analysis and the automation thereof.

In a biological analysis laboratory, optimal management of the flow of specimens has become a crucial factor. This is because the larger a laboratory, the more complicated and necessary it becomes to optimize the management of the flow of biological samples being analyzed. There are two criteria that are particularly important to consider: the specimen treatment time, and the workload that each action imposes on the laboratory staff.

In order to improve performance according to these criteria, biological analysis systems have been developed which are based on placing a number of biological-analysis devices in communication with one another via a means for transporting racks that hold tubes of specimens. Combining several devices via the transport means allows better management of breakdowns and problematic situations, and allows certain turn flow management strategies to be implemented.

These systems generally comprise an inlet for the racks, a transport means which distributes the racks at the inlet to one of the devices connected to it, and an outlet for the racks that have been analyzed. Certain systems may comprise a buffer zone at the inlet and/or at the outlet, and may employ flow management algorithms.

However, these systems can be improved both in terms of their flow management and in terms of the bulk that characterizes them. Specifically, there is not yet in existence an effective means of treating/processing racks referred to as specific, namely those which need to be treated/processed with a different level of priority from the conventional test tubes. Solutions do exist and consist in creating specific inlets for priority racks, and this presents problems in terms of bulk.

The invention seeks to improve the situation. To that end, it proposes a biological analysis system comprising at least one inlet and one outlet, at least two biological analysis devices connected to one another by a conveyor defining a closed circuit, each biological analysis device comprising a region for the exchange of tube-holding racks with the conveyor, the conveyor and the at least one inlet of the biological analysis system comprising at least one reader of an identifier of a tube-holding rack which reader is designed to communicate an identifier it has read to a controller of the biological analysis system, which controller is designed to apply a specific treatment to a tube-holding rack identified by the reader of the conveyor and the identifier of which has not previously been read by the inlet reader of the biological analysis system.

This biological analysis system is particularly advantageous because it allows gains to be made in terms of compactness, the inlets and outlets of the system being embodied by the inlets and outlets of the devices of which it is composed. In addition, having several inlets and several outlets for the system makes it possible to implement flow management strategies that allow the workload of the laboratory staff to be optimized.

According to various alternative forms, the accessory according to the invention may exhibit one or more of the following features:

the conveyor comprises as many readers as there are tube-holding rack exchange regions, the controller is designed to apply a specific treatment dependent on the identifier of a tube-holding rack that is to undergo specific treatment, the controller is designed to apply a specific treatment with a different level of priority compared with the tube-holding racks received by the inlet of the biological analysis system which is dependent on the specific treatment that is to be applied, the controller is designed to treat, as a matter of priority, a tube-holding rack that is to undergo a specific treatment and the rack identifier of which indicates that it contains tubes that are to undergo tests, the controller is designed to treat a tube-holding rack that is to undergo specific treatment and the identifier of which indicates that it contains control tubes with a level of priority that is dependent on the way in which the control is preserved and/or on the scheduling of the checks of the biological analysis devices, the controller is designed to treat a tube-holding rack that is to undergo specific treatment and the identifier of which indicates that it contains tubes of reagent with a level of priority that is dependent on the way in which the reagent is preserved and/or on the quantity of reagent still present in one or more of the biological analysis devices, the readers are optical readers or radiofrequency readers, and each biological analysis device comprises at least one inlet and one outlet for tube-holding racks, the inlet of at least two biological analysis devices each forming an inlet for tube-holding racks to the biological analysis system and each comprising a respective reader, and the outlet of at least two biological analysis devices each forming an outlet for tube-holding racks from the biological analysis system, and the exchange region of each biological analysis device being distinct from the inlet and from the outlet of this biological analysis device.

The invention also relates to a biological analysis method, involving introducing at least one tube-holding rack into a biological analysis system as described herein, reading a rack identifier as this rack moves past the reader of the conveyor and, when this identifier has not been read beforehand by the reader at the inlet of the biological analysis system, applying a specific treatment to this tube-holding rack.

Figure 2:
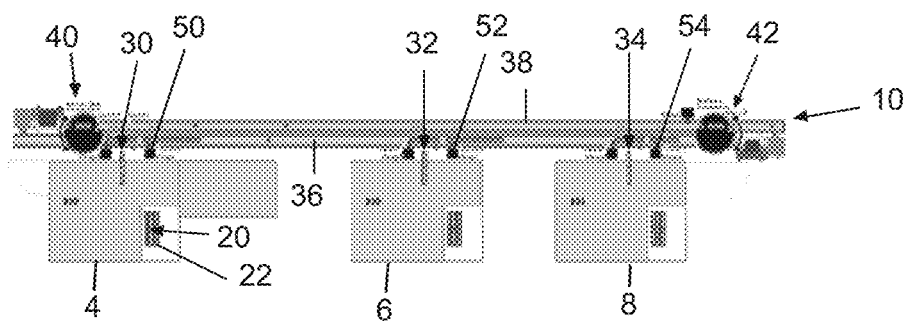

Further features and advantages of the invention will become better apparent from reading the following description, taken from illustrative and nonlimiting examples taken from the drawings, in which:

FIG. 1 depicts a perspective view of a biological analysis system according to the invention, and FIG. 2 depicts a view of FIG. 1 from above.

The drawings and the description that follow essentially contain elements of certain nature. They may therefore serve not only the better to understand the present invention, but also to contribute to the definition thereof, where appropriate.

FIG. 1 depicts a perspective view of a biological analysis system 2 according to the invention, and FIG. 2 depicts a view of FIG. 1 from above. As can be seen in this figure, the biological analysis system 2 comprises three biological analysis devices 4, 6 and 8, a slide staining/spreading device 9, a conveyor 10 and a controller 12.

In the example described here, the biological analysis devices 4, 6 and 8 are of the hematology analyzer type. The biological analysis device 4 (or 6, 8, respectively) comprises a stage 14 (or 16, 18, respectively) which receives racks 20 holding tubes 22 that are to be analyzed. The biological analysis device 4 (or 6, 8, respectively) also comprises a stage 24 (or 26, 28, respectively) which receives the racks 20 of tubes 22 which have been analyzed. The biological analysis device 4 (or 6, 8, respectively) also comprises an exchange region 30 (or 32, 34, respectively) which allows a rack 20 to be transferred onto the conveyor 10 or is able to receive a rack 20 from said conveyor.

The three hematology analyzers 4, 6, 8 are able to measure a specimen of blood contained in a tube 22. Each apparatus picks up the tube 22 contained in a rack 20 which is positioned either on a loading stage or on the conveyor, behind the measurement apparatus. When the blood specimen measurement is complete, the apparatus places the tube back in a rack.

The slide staining/spreading device 9 prepares slides of blood which are intended to be analyzed. First of all, a volume of blood is taken from a tube 22 which is held in a rack 20. Next, the blood sample is deposited on a slide, spread across the slide in order to obtain a thin layer, and then dried. The specimen is then stained.

The conveyor 10 defines a closed circuit and in the example described here comprises a line in the form of a loop comprising two paths 36 and 38. The line 36 is connected to each of the exchange regions 30, 32 and 34 so that a rack 20 is introduced onto the conveyor 10, or recovered from same, from the path 36. The conveyor 10 drives the path 36 in one direction and the line 38 in a direction opposite to the direction of driving of the line path 36.

The conveyor 10 also comprises two return devices 40 and 42 which are respectively positioned downstream of the device 4 and upstream of the device 8 in relation to the direction of driving of the path 36.

The purpose of the return device 40 is to transfer a rack 20 from the path 36 to the path 38, and the purpose of the return device 42 is to transfer a rack 20 from the path 36 to the path 38 by rotation through 180°. Thus, whatever the exchange region 30, 32 or 34 via which a rack 20 has been introduced onto the conveyor 10, this rack 20 can be sent to any one of the devices 4, 6 or 8, according to transport rules. This capability, whatever means are employed in order to implement it, characterizes the fact that the conveyor 10 defines a closed circuit.

As an alternative, the conveyor 10 may be produced in the form of two lines 36 and 38 driven independently and connected by the return devices 40 and 42.

Thus, the stages 14, 16 and 18 form inlets of the system 2, the stages 24, 26 and 28 form outlets of the system 2, and the exchange regions 30, 32 and 34 for exchanges between the devices 4, 6 and 8 and the conveyor 10 are distinct from the inlets and outlets of the system 2.

Each inlet of the system 2 comprises a reader designed to read a rack identifier on the racks 20. These readers are situated in the casing of each biological analysis device 4, 6, 8, near the stages 14, 16 and 18. The identifier may be used by the controller 12 to determine the operations and/or tests to be performed on the tubes of a given rack and to manage the transfer of the racks between biological analysis devices if necessary.

In the example described here, the conveyor 10 comprises, at each exchange region 30 (or 32, 34, respectively), a reader 50 (or 52, 54, respectively) similar to the readers at the inlets 14, 16 and 18, so as to make it possible to identify the racks 20 which are being transported by the conveyor 10 and communicate with the controller 12 in order to determine the action to undertake each time a rack 20 is facing an exchange region 30 (or 32, 34, respectively). As an alternative, the conveyor 10 could comprise a single reader.

The readers may be embodied by any means capable of recovering information regarding the identity of the racks, for example by reading an optical code (barcode or QR code) or by reading a radio tag (RFID or the like).

In various alternative forms, the inlet and the outlet of one or more devices may be interchanged, or may be produced on the one same stage, with suitable separation between them. Similarly, depending on the configurations, the exchange region may be situated closer to the inlet and to the outlet of one or more devices, provided that these remain clearly distinct from one another. Some of the inlets and/or outlets may be omitted.

In the example described here, the specimens contained in the tubes 22 held in a rack 20 may be subjected to analyses in the biological analysis device into which that rack has been introduced into the system 2 before being transferred to the conveyor 10 or leaving directly via one of the stages 24, 26 or 28 without passing via the conveyor 10, or may be transferred directly from the inlet via which it was introduced toward the exchange region of the device concerned.

The controller 12 in the example described here is a computer which in the conventional way comprises a display, a dispatcher, a memory and a network interface allowing it to communicate with the biological analysis devices.

The memory may be any type of data storage device suited to receiving digital data: hard disk, solid-state drive (SSD) or flash memory in any other form, random access memory, magnetic disk, storage distributed locally or in the cloud, etc. The data calculated by the device may be stored on any type of memory similar to the memory 2 or in that memory. These data may be erased after the device has performed its tasks, or may be saved.

The dispatcher accesses the memory directly or indirectly in order to implement the functions of the controller 12. It may be produced in the form of suitable computer code executed on one or more processors. What is meant by processors is any processor designed to process computer data. Such a processor may be produced in any known way, in the form of a microprocessor for a personal computer, of a dedicated chip of FPGA or SoC (System on Chip) type, of a computing grid resource, of a microcontroller, or in any other form capable of providing the computing power needed for the embodiment described below. One or more of these elements may also be produced in the form of specialized electronic circuits such as ASICs. A combination of one or more processors and of one or more electronic circuits may also be envisioned.

The controller 12 is connected to the biological analysis devices 4, 6 and 8 in order to access all the data regarding the analyses performed and in progress and the status of the racks 20 received in these devices, and is also connected to the conveyor 10 notably in order to know what racks 20 this conveyor is carrying.

Thus, the controller 12 is able to organize the flow of racks 20 throughout the biological analysis system 2, by having access to all the data characterizing the status of the racks 20 in the process of being treated, the status of the analyses in progress and the analyses already performed, and the analyses scheduled for the racks 20 received at the inlets of the system 2.

The controller 12 is therefore in a position to determine a workload status for each of the biological analysis devices 4, 6 and 8 and command the transfer of racks 20 on the conveyor 10 from one device to another according to the workload status of the devices, according to strategies for managing the workload of the biological analysis system 2, according to the distribution of workload of staff interacting with the biological analysis system 2, according to additional analyses required, according to breakdowns, according to the number of analysis devices on the line, etc.

What is meant by the workload status is the total number of racks that a biological analysis device receives, added to the number of racks on the conveyor that are intended for that device. The workload status of a given biological analysis device is considered to be "overloaded" when this number exceeds a predetermined quantity. This predetermined quantity may be defined on the basis of a number of parameters: the anticipated work rate of the system, the number of free spaces on the agitator or agitators of the device concerned, the mean time taken to move a rack from one device to another, etc.

The controller 12 has the task of determining which racks are to be taken over by a biological analysis device other than the one at which they were introduced into the system 2 in order to improve the work rate and/or take account of imponderables, and to determine the outlets for the racks that have been analyzed. The controller 12 may therefore implement one or more current workload management strategies and one or more outlet management strategies. In addition, as will be seen, centralizing the management of the racks by the controller 12 makes it possible to implement innovative management of the specific racks that are to be treated/processed with a level of priority different from that of the conventional analysis tubes.

Specifically, as was seen above, each rack 20 which is introduced into the system 2 via the inlet 14, 16 or 18 is identified by the reader at that inlet. That means that any rack 20 which is situated on the conveyor 10 and which has been introduced via one of these inlets has an identifier present in the memory of the controller 12. Conversely, that means that a rack 20 the identifier of which might be read by one of the readers 50, 52 or 54 without being present in the memory of the controller 12 has not been introduced via one of the inlets of the system 2 but has been placed directly onto the conveyor 10.

Thus, the conveyor 10 can be used as an inlet for the specific racks, and it is the absence of the identifier of these racks in the controller 12 that will allow these to be identified and treated/processed as a matter of priority.

Once a specific rack has been identified as a priority specific rack, the controller 12 assigns it to that biological analysis device of the system 2 that is able to perform the highest number of tests on the tubes of that rack. The priority specific rack in that case by definition takes priority over the other racks received into the system 2. By sending it to the biological analysis device capable of performing the highest number of tests intended for the tubes that it is transporting, it is treated/processed more efficiently because the greatest number of tests are performed on the one same biological analysis device, thus reducing the amount of time spent being conveyed by the conveyor 10. This routing criterion may of course be customized, for example to direct a specific rack toward the biological analysis device that has the lowest workload, or to use a criterion that combines workload with the number of scheduled tests that can be performed. The introduction of the specific rack into the biological analysis device that is to treat/process it takes priority over any other rack present on the conveyor 10 or present on one of the stages 14, 16 or 18. Thus, the specific rack will be treated/processed as a matter of priority within the biological analysis device that receives it.

In addition to being used for priority analyses, a specific rack may also be used for carrying out other types of specific operations, such as checks and replenishing reagents.

Specifically, certain biological analysis devices need to have their operation validated at regular intervals, this being performed by the use of so-called control racks containing tubes for which a control test value is expected. The tests on the control rack make it possible to ensure that the biological analysis device is operating correctly. Conventionally, these tests cannot be performed "on-the-fly" and may require all or part of the system 2 to be shut down, losing valuable system operating time because all the biological analysis devices are unavailable because one or two of them are being tested.

The priority of the control rack can be customized by the staff and can be dependent on the type of check. A default setting is to assign the control rack a priority that is lower than the priority test racks but higher than the other test racks and than the reagent racks.

Treating/processing the control racks as priority racks makes it possible to limit the downtime of the system 2 and further optimize the work rate.

In addition, the racks may be used to replenish the biological analysis devices with reagents for certain tests. Conventionally, these reagents are stored in reservoirs within each biological analysis device and are changed directly therein, or are stored in reservoirs separate from the system 2 and distributed to the biological analysis devices directly on demand.

In the example described here, this management is rendered completely obsolete because the reagents can be transported on racks. A significant space-saving is thus made because the reagents can be replaced and moved around as needed, without a dedicated storage unit and without shutting down the biological analysis devices to proceed with replacement either.

In addition, it becomes possible for costly reagents to be shared between the various biological analysis devices in accordance with need. Finally, these operations are managed by the controller 12, which means that it is possible to prioritize the specific racks with reagents according to a status of the tests in progress.

For example, their priority may vary:
  according to the way in which the reagent is preserved. If it is a sensitive reagent, it will take priority over the test racks; if it is a reagent that does not require special preservation measures, it will take a lower priority than a test rack,
  according to need. A value representing the number of tests that can still be performed before restocking of reagent is defined. If the number of tests that can still be performed without restocking reagent is above the predefined value, the specific rack containing the reagents does not take priority over the test racks. By contrast, if the number of tests that can still be performed without restocking reagent is below the predefined value, the specific rack containing the reagents takes priority over the test racks.

Furthermore, the controller 12 may also manage the priority of the specific racks at the outlet. For example, it may command that the specific racks be let out as quickly as possible with a view to controlling problems with preservation (control specimens, reagents, etc.) and to optimizing the treatment/processing time of a specific test rack in instances in which additional analyses need to be performed.

The invention claimed is:

1. A biological analysis system comprising
at least one inlet and at least one outlet, at least two biological analysis devices connected to one another by a conveyor defining a closed circuit, each biological analysis device comprising an exchange region for the exchange of tube holding racks with the conveyor, one of the at least one inlet and one of the at least one outlet integrated into each of the at least two biological analysis devices, each of the at least one inlet of the biological analysis system comprising an inlet reader of an identifier of a tube holding rack, and the conveyor comprising as many conveyor readers as there are exchange regions for exchanging tube holding racks, wherein each inlet reader and the conveyor readers are configured to communicate the identifier they have read to a controller, the controller being part of the biological analysis system, wherein the controller is configured to apply a specific treatment to a tube holding rack identified by at least one of the conveyor readers when the identifier has not previously been read by the at least one inlet reader of the biological analysis system.

2. The system of claim 1, wherein the controller is configured to apply a specific treatment dependent on the identifier of a tube holding rack that is to undergo specific treatment.

3. The system of claim 2, wherein the controller is configured to apply a specific treatment with a different level of priority compared with the tube holding racks received by the inlet of the biological analysis system which is dependent on the specific treatment that is to be applied.

4. The system of claim 1, wherein the controller is configured to treat, as a matter of priority, a tube holding rack that is to undergo a specific treatment and the rack identifier of which indicates that it contains tubes that are to undergo tests.

5. The system of claim 1, wherein the controller is configured to treat a tube holding rack that is to undergo specific treatment and the identifier of which indicates that it contains control tubes with a level of priority that is dependent on the way in which the control is preserved and/or on the scheduling of the checks of the biological analysis devices.

6. The system of claim 1, wherein the controller is configured to treat a tube holding rack that is to undergo specific treatment and the identifier of which indicates that it contains tubes of reagent with a level of priority that is dependent on the way in which the reagent is preserved and/or on the quantity of reagent still present in one or more of the biological analysis devices.

7. The system of claim 1, wherein the readers are optical or radiofrequency readers.

8. The system of claim 1, wherein each biological analysis device comprises at least one inlet and one outlet for tube holding racks, the inlet of at least two biological analysis devices each forming an inlet for tube holding racks to the biological analysis system and each comprising a respective reader, and the outlet of at least two biological analysis devices each forming an outlet for tube holding racks from the biological analysis system, and the exchange region of each biological analysis device being distinct from the inlet and from the outlet of each biological analysis device.

9. A biological analysis method comprising introducing at least one tube holding rack into the biological analysis system of claim 1, reading a rack identifier as this rack moves past the reader of the conveyor and, when this identifier has not been read beforehand by the reader at the inlet of the biological analysis system, applying a specific treatment to this tube holding rack.

10. The system of claim 1, wherein the conveyor further comprises at least one return device.

11. The system of claim 1, wherein the at least two biological analysis devices are hematology analyzer devices and the system further comprises at least one slide staining device, and at least one stage, wherein the hematology analyzer devices are configured to pick up a tube in the tube holding rack positioned either on the at least one stage or on the conveyor, and measure a blood sample, and wherein the at least one slide staining device is configured to deposit the blood sample on a slide, spread the blood sample across the slide obtaining a thin layer, dry the thin layer of blood sample, stain the thin layer of blood sample, and place the tube back in the tube holding rack.

12. The system of claim 1, wherein the controller is a computer comprising a display, a dispatcher, a memory and a network interface programmed to communicate with the at least two biological analysis devices.

* * * * *